United States Patent [19]

Martin

[11] 3,860,232
[45] Jan. 14, 1975

[54] ADJUSTABLE STACKER LAYBOY
[76] Inventor: Merrill D. Martin, No. 2 Mall Ct., Oakland, Calif. 94611
[22] Filed: Mar. 29, 1973
[21] Appl. No.: 345,895

Related U.S. Application Data
[63] Continuation of Ser. No. 160,599, July 8, 1971.

[52] U.S. Cl.............. 271/198, 198/34, 198/190, 271/64
[51] Int. Cl..................... B65h 29/12, B65g 47/26
[58] Field of Search ............. 271/198–203, 271/220, 64; 198/34, 190

[56] References Cited
UNITED STATES PATENTS
1,086,353  2/1914   Dick ................................ 271/220
1,252,681  1/1918   Friess .............................. 271/198
2,804,196  8/1957   Planett ........................... 15/308 X
3,143,344  8/1964   Miller et al. .................... 271/199
3,410,183  11/1968  Sarka .............................. 271/198
3,546,733  12/1970  Johnson ........................... 15/308

Primary Examiner—Evon C. Blunk
Assistant Examiner—James W. Miller
Attorney, Agent, or Firm—George B. White

[57] ABSTRACT

The invention as herein illustrated is for adjusting the spacing between and the longitudinal direction of conveyors on a layboy transmitting multiple out cuts from a rotary die cutter, thereby to separate the sheets laterally before they are transmitted to a stacker, and also varying the speed of the conveyors of the layboy in relation to the speed of the conveyor belts on the stacker to obtain longitudinal separation of the sheets, thereby to permit multiple stacks to be made simultaneously without the edges of one stack inter-leaving with one another.

11 Claims, 8 Drawing Figures

INVENTOR
MERRILL D. MARTIN
BY George B. White
ATTORNEY

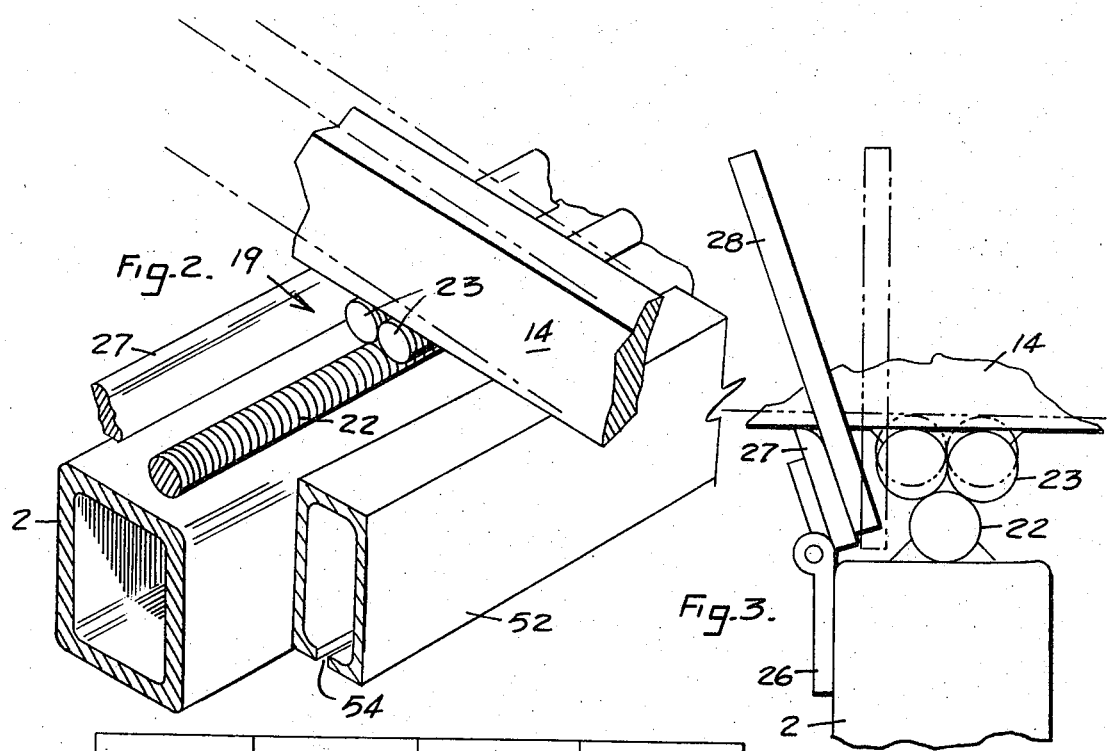
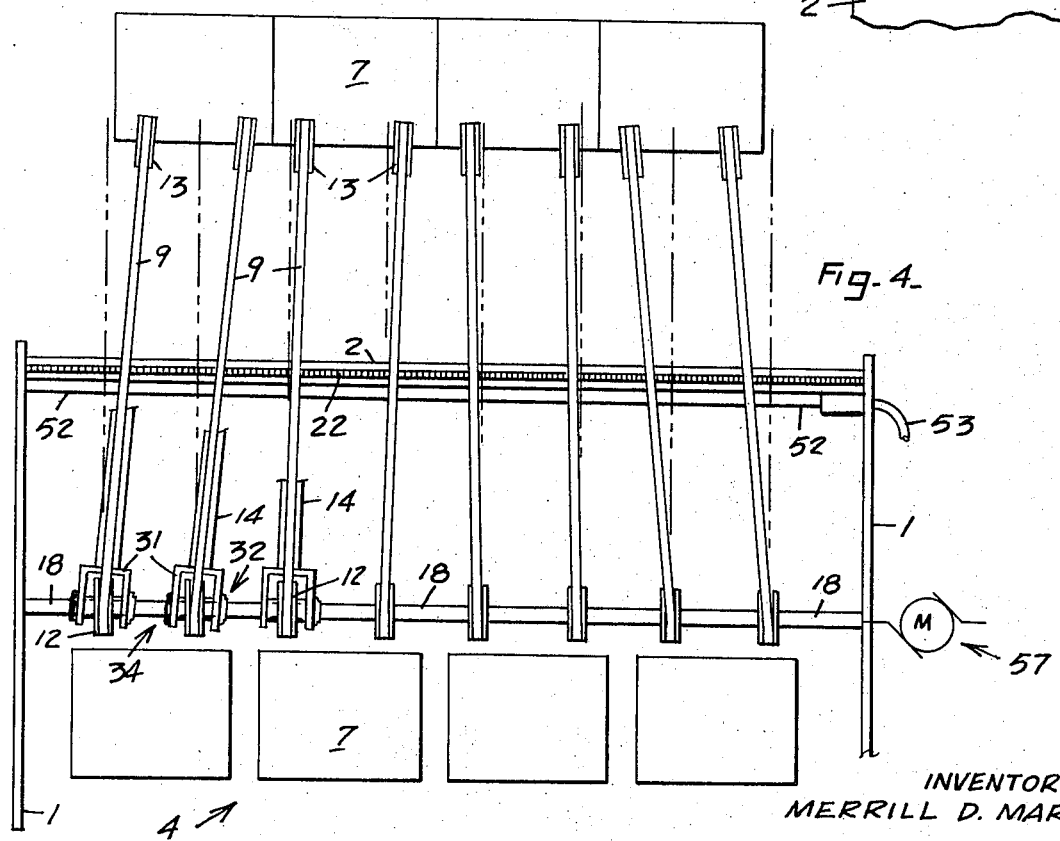

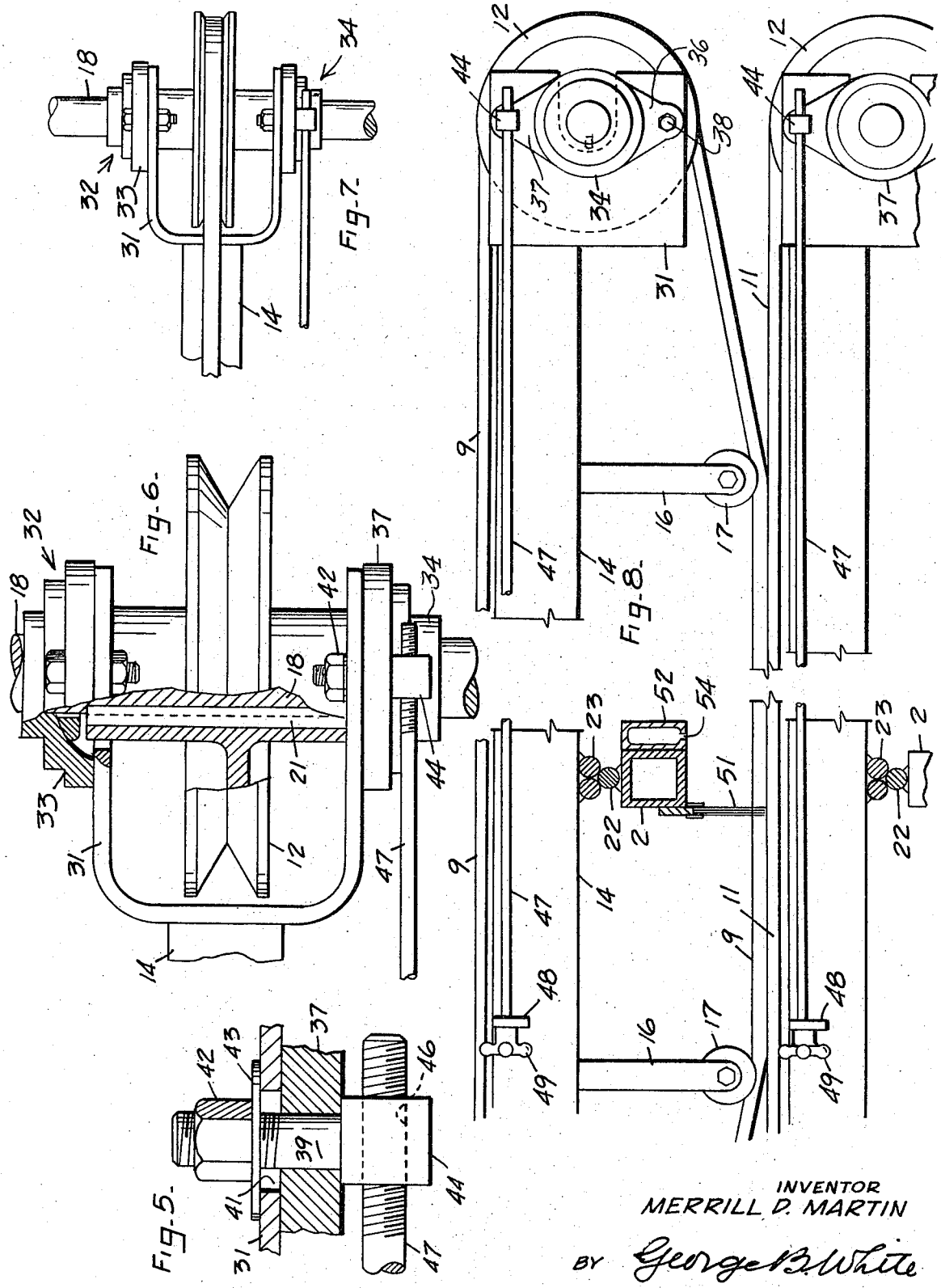

ADJUSTABLE STACKER LAYBOY

This is a continuation of application Ser. No. 160,599, filed July 8, 1971.

BACKGROUND OF THE INVENTION

The problem in transmitting multiple out cuts from a rotary die cutter or the like to a stacker, for instance of the type described in U.S. Pat. No. 3,321,202, granted on May 23, 1967, is that the adjacent sheets tend to overlap each other and inter-leave on the stacker.

The primary object of the invention is to provide a layboy which has an adjusting mechanism whereby the arms supporting the belt conveyors can be adjusted angularly to adjust the distance or spacing between the adjacent belt conveyors and also the direction of the belt conveyors, whereby the multiple sheets simultaneously emerging from the die cutter are laterally separated and transferred to the stacker in transversely spaced relation.

DESCRIPTION OF THE DRAWINGS

FIG. 2 is a fragmental perspective detailed view illustrating the means for holding the conveyor arms in adjusted position.

FIG. 3 is a fragmental detailed view of the lever mechanism for lifting the arms from the holding means.

FIG. 4 is a diagrammatic plan view illustrating the laterally adjusted layboy conveyors and the corresponding spacing and separation of the sheets.

FIG. 5 is a fragmental partly sectional view of the adjusting mechanism for the self-aligning bearings for the drive pulley of the belt conveyor of the layboy.

FIG. 6 is a fragmental top plan view of the mounting of the drive pulley on the drive shaft.

FIG. 7 is a top plan view of the drive pulley with the belt on the same.

FIG. 8 is a fragmental side view partly broken away and partly in section of the top and bottom belts of the belt conveyors and their drive and adjusting device.

DETAILED DESCRIPTION

Figure 1:
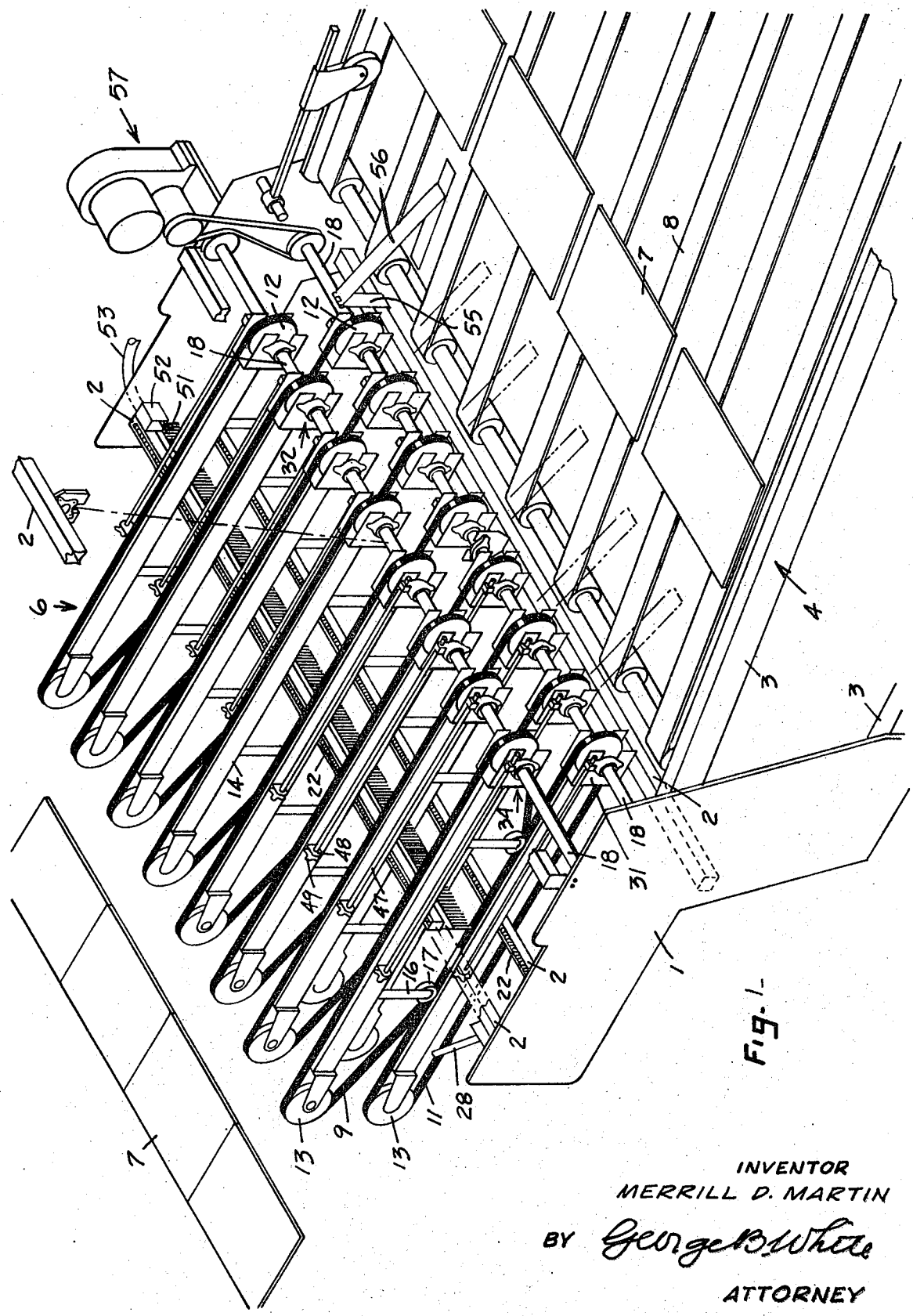
FIG. 1 is a perspective view of the adjustable layboy illustrating the multiple cut sheets and the intake end of the stacker with the separated sheets thereon.

Viewing FIG. 1, the layboy is supported on suitable frame plates 1 which are rigidly connected by cross bars 2 and are suitably mounted on frame members 3 of a stacker conveyor 4. A plurality of spaced layboy belt conveyors 6 are supported between the plates 1 so as to receive the multiple out cut sheets 7 from the die cutter, not shown, and transfer them to the conveyor belts 8 of the stacker conveyor 4.

The separate conveyors 6 are each arranged in pairs, namely, an upper conveyor belt 9 and a lower conveyor belt 11, so that the sheets 7 are received between the conveyor belts 9 and 11 and are positively advanced to the stacker conveyor belts 8. Each conveyor belt 9 is a V belt held on V belt pulleys 12 and 13 at the opposite ends of an arm 14. A pair of short arms 16 extend downwardly from each arm 14 with suitable rollers 17 on their lower ends bearing upon the upper belt 9 so as to hold the upper belt 9 in suitable contact with the lower belt 11.

Each arm 14 is supported at one end on a drive shaft 18 suitably journalled in the end frame members or plates 1 and by releasable holding means 19 approximately halfway between the ends of the arm 14.

The drive pulleys 12 are slidably connected, for instance by a key 21, as shown in FIG. 6, to the drive shaft 18. The releasable holding means 19 include a threaded or serrated bar 22 which extends transversely across the entire layboy between the plates 1 and is supported on one of the cross bars 2. A pair of short threaded bars 23 are welded on the underside of each arm 14, the threads or serrations of which interlock with the threads or serrations on the bar 22 thereby to hold the arm 14 in adjusted position. In order to adjust the spacing between the layboy conveyors, the respective conveyors are lifted so as to disengage the short bars 23 from the threaded cross bar 22 and then to slide the drive pulley 12 along the drive shaft 18 to the desired position and at the desired angle. To facilitate such disengagement, on the cross bar 2 is mounted an arm lifting device, which includes a pivot bracket 26 at each end, in which latter is pivoted a transverse lifting plate 27, shown in FIG. 3. A hand lever 28 extended from the lifting plate 27 at one end permits the manipulation of the lifting plate 27 from an initial position shown in full lines in FIG. 3 to a lifting position shown in broken lines in FIG. 3, whereby the engagement of the upper edge of the lifting plate 27 with the lower surfaces of the conveyor arms 14 lifts the conveyor arms and the short threaded bars 23 out of engagement from the threaded cross bar 22.

The drive pulleys 12 remain at right angles to the drive shaft 18 in all adjusted positions and the engagement of the V belt with the respective V belt pulleys assures driving engagement between the belts and the pulleys in all positions. However, in order to facilitate the adjustment of the arms 14 to the various angles of adjustment, the driving end of each arm 14 has a U-shaped brace 31. The legs of the U-shaped brace 31 have suitable well known self-aligning bearings 32 on the drive shaft 18. The inner race of the bearing is slideable on the drive shaft 18. The bearing housing 33 on the outer race of one of the bearings is fixedly secured to the adjacent leg of the brace 31. The housing 34 on the outer race of the other self-aligning bearing has a lower flange 36 and an upper flange 37. As shown in FIG. 8, the lower flange 36 of the bearing housing 34 is held by a pivot bolt 38. The upper flange 37 has a bolt 39 extended therethrough as shown in FIG. 5. The bolt 39 also extends through an elongated slot 41 in the adjacent leg of the brace 31 and is held in place by a nut 42 bearing against a suitable washer 43. The head of the bolt 39 is formed by a threaded block 44, the threaded hole 46 of which is located parallel with the arm 14. A long adjusting screw 47 is threaded in the threaded hole 46 of the block 44 and extends along the arm 14 as shown in FIG. 8, and through a bearing lug 48 extended from the arm 14. On the end of the threaded bar 47 adjacent the lug 48 and bearing agents it is a handle 49 whereby the threaded bar 47 may be turned. By turning the handle 49 and the threaded bar 47, the force exerted on the block 44 tends to turn the adjacent housing 34 and the outer race of the bearing therein around the pivot bolt 38, and due to the usual spherical nesting of the self-aligning bearings, the force transmitted to the brace 31 turns the brace 31 to conform to the angular arrangement of the arm 14, while the drive pulley 12 remains in its right angle position relative to the drive shaft 18. In this manner a certain degree of angular adjustment may be accomplished even without disengaging the holding means 19 because the thread or serration engagement between the short threaded bars 23 and the long threaded bar 22 permits a certain degree of pivoting horizontally, therefore by turning the handle 49, the force exerted will slide the brace 31 and the drive pulley 12 together along the drive shaft 18 simultaneously adjusting the angle of the brace 31 to the adjusted angular position of the arm 14.

In effect when the threaded bar 47 is turned the force exerted pulls the self-aligning bearings out of alignment. The self-aligning of the bearings then exerts a force axial to the drive shaft 18 and accomplishes a limited axial shifting. This can be achieved because of the aforesaid pivotable engagement between the short threaded bars 23 and the long threaded bar 22. Of course, adjustment can be also accomplished by lifting the free end of the arm 14 to disengage its short bars 23 from the long bar 22.

To the upper cross bar 2 which carries the threaded holding bar 22, is secured a longitudinal brush or brushes 51 which extend downwardly so as to be in brushing contact with the sheets 7 carried between the belts 9 and 11, so as to brush off whatever cuttings or loose particles may be on the surface of the sheets.

For this purpose there is also provided along a face of the same cross bar 2 a manifold 52 which is connected through a conduit 53 to a suitable source of compressed air. As shown in FIG. 2, the manifold 52 has a nozzle slit 54 along its lower wall so that the air under pressure blows downwardly and on to the tops of the sheets 7 for blowing off whatever loose particles may remain on the sheets 7 after they were brushed.

On the cross bar 2 nearest to the stacker 4 there is provided adjacent each conveyor unit 6 a bracket plate 55 which extends to about the height of the lower belt 11, and which has pivoted on its top a flat guide bar 56 which can be lowered in the position shown in FIG. 1 for guiding the sheets 7 on to the top of the conveyor belt 8 of the stacker 4, whenever the intake end of the stacker 4 is lower than the discharge level from the conveyors 6.

Both drive shafts 18 are driven by the driving mechanism such as a motor and transmission unit indicated at 57 mounted on one of the bracket plates 1.

I claim:

1. In a layboy for transferring sheets from one machine to another,
   a frame between the machines,
   conveying means on the same frame having a receiving end adjacent to one machine and a delivery end adjacent to the other machine,
   said conveying means including a plurality of conveyors side by side in horizontal registry and longitudinal with respect to said machines and being spaced transversely from one another to carry sheets from said receiving end to said delivery end,
   releasable means to hold each of said conveyors in adjusted spaced positions,
   adjustable mounting means to adjustably support one end of said conveyors,
   and means to drive said conveyors,
   each conveyor including
   a longitudinal rigid arm extending from end to end of the conveyor,
   a pulley at each end of said arm,
   said means to drive said conveyors including a transverse drive shaft extending through said adjustable mounting means,
   each pulley at said one end being a drive pulley and being connected to said drive means at the respective mounting means, said mounting means being adjustable on said shaft,
   a conveyor belt played around said pulleys on each arm,
   each belt moving longitudinally around and above and below said arm in a substantially perpendicular plane of said arm,
   said releasable holding means including
   a transverse support member on said frame for said arms, and
   releasable coacting means between an intermediate portion of each arm and said transverse support member to pivotably hold said arm in adjusted position along said transverse support member.

2. The layboy specified in claim 1, and
   each of said pulleys having peripheral grooves to confine said belt therein.

3. The layboy specified in claim 1, and
   said adjustable mounting means including an element on the end of each arm adjacent said driving pulley,
   said element being adapted to rotatably and slideably hold said driving pulley on said drive shaft,
   and manipulable means to apply force to said element to adjust the angle of said element to correspond to the angular adjustment of the arm and to slide said driving pulley on said drive shaft into the corresponding adjusted position.

4. The layboy specified in claim 1, and
   said adjustable mounting means including a bearing element on the end of each arm,
   self-aligning bearing means in said element and on said drive shaft, being adapted to rotatably and slideably hold said driving pulley on said drive shaft,
   and manipulable means to apply force to said element and self-aligning bearing means to adjust the angular position of said element relatively to said self-aligning bearing and to said driving pulley to correspond to the angular adjustment of the arm, thereby to slide said driving pulley on said drive shaft into the corresponding adjusted position.

5. The layboy specified in claim 4, and
   said element being a U-shaped brace,
   said self-aligning bearing means being a self-aligning bearing in each leg of said U-shaped brace, whereby said element is self-adjustable to the angular adjustment of the arm relatively to the driving pulley.

6. The layboy specified in claim 5, and
   a hub on each side of said driving pulley engaged by the inner race of said self-aligning bearings to be held in coacting relation to the respective belt in all adjusted positions of said arm and said element.

7. The layboy specified in claim 1, and
   said releasable co-acting means including retaining grooves on said transverse support member,
   grooved members on the adjacent intermediate portions of the respective arms interlocking with the respective grooves of said transverse support member, and manipulable means to lift said arms out of engagement from said support member for transverse adjustment.

8. The layboy specified in claim 1, and each conveyor including a pair of arms, one arm spced substantially above the other, said drive pulley being at the delivery end of each arm connected to said driving means, and means on the upper arm to urge the belt thereof toward the belt on the lower arm to hold said sheets carried between the adjacent portions of said belts, and separate transverse support members for the upper arm and for the lower arm, each support member being adjacent the intermediate portion of the respective arms, and releasable co-acting means between the intermediate portion of each arm and the adjacent transverse support member.

9. The layboy specified in claim 8 and brush means extended from the upper transverse support member toward the lower transverse support member in brushing contact with the sheet carried between said conveyor belts for brushing the surfaces of the sheets carried thereunder.

10. The layboy specified in claim 9, and pneumatic means supported on said upper support member adjacent said brush means to direct a cleaning airflow on to said sheets carried by said conveyors.

11. The layboy specified in claim 1, and said one end being the delivery end of said conveyors, the machine at said delivery end being a sheet stacker, guide means supported on said frame adjacent the delivery end of said conveyors and extended over said stacker to guide said sheets from said conveyors onto said stacker.

* * * * *